(12) United States Patent
Keech

(10) Patent No.: US 6,256,590 B1
(45) Date of Patent: Jul. 3, 2001

(54) ELECTROMAGNETIC FLOWMETER

(75) Inventor: Ray Keech, Stonehouse (GB)

(73) Assignee: ABB Instrumentation Limited, Huntingdon (GB)

( * ) Notice: Subject to any disclaimer, the term of this patent is extended or adjusted under 35 U.S.C. 154(b) by 0 days.

(21) Appl. No.: 09/216,696

(22) Filed: Dec. 18, 1998

(30) Foreign Application Priority Data

Dec. 19, 1997 (GB) .................................................... 9726911

(51) Int. Cl.$^7$ ........................................................ G01F 1/00
(52) U.S. Cl. .............................. 702/45; 702/49; 702/50; 702/100; 73/861.11; 73/861.16; 73/861; 73/861.78; 73/861.356
(58) Field of Search ................................ 702/45, 50, 100, 702/49; 73/861.11, 861.77, 861.78, 861.13, 861, 861.356; 324/256, 257, 258

(56) References Cited

U.S. PATENT DOCUMENTS

| 4,156,363 | 5/1979 | Suzuki et al. . |
| 4,218,915 | 8/1980 | Torimaru . |
| 4,236,410 | 12/1980 | Appel et al. . |
| 5,325,724 | 7/1994 | Kiene et al. . |
| 5,402,685 | 4/1995 | Brobeil . |

FOREIGN PATENT DOCUMENTS

| 4019237 A1 | 6/1990 | (DE) . |
| 0 559 350 A1 | 8/1993 | (EP) . |
| 1331200 | 9/1973 | (GB) . |
| 2106652 | 4/1983 | (GB) . |

*Primary Examiner*—Kamini Shah
*Assistant Examiner*—Hien Vo
(74) *Attorney, Agent, or Firm*—Larson & Taylor, PLC

(57) ABSTRACT

In an electromagnetic flowmeter, the conventional derivation of flow velocity is corrected or replaced by an alternative calculation to take into account estimated non-linear dependence of field strength produced by the coil with applied coil current. This can be used to enable more accurate measurement, over a wider range of coil current. The improved accuracy allows the coil current to be adjusted to optimise power consumption; the adjustment of coil current in this manner is another aspect of the invention.

16 Claims, 6 Drawing Sheets

ELECTROMAGNETIC FLOWMETER

BACKGROUND OF THE INVENTION

1. Field of the Invention

The present invention relates to electromagnetic flowmeters used to monitor fluid flow.

2. Description of Prior Art

Electromagnetic flowmeters operate, as is well known, by passing a current through a coil to generate a magnetic field and detecting an electro-motive force, measured in volts, induced in a fluid passing through the field. The output voltage, E, is proportional to the product of the field, B, and flow velocity, v, and thus:

$$E = k \cdot B \cdot v. \quad \text{(equation 1)}$$

The constant k will depend on factors such as the sensitivity of the meter and the spacing of the electrodes, but can be considered constant for a given apparatus. It is generally assumed that the magnetic field strength in the coil is linearly proportional to the current, I, flowing in the coil so that:

$$B = m \cdot I \quad \text{(equation 2)}$$

The value of m is normally considered a constant approximating to:

$$m \approx \frac{N\mu}{l}$$

where  $\mu$ = permeability of free space
$l_a$ = the length of the air gap, and
$N$ = the number of turns of the coil Thus, the output signal is proportional to the product of current and velocity, and can be expressed by substitution for B from equation (2) into equation (1) as:

$$E = km \cdot I \cdot v. \quad \text{(equation 3)}$$

Measurement is normally carried out at a fixed current, provided by a constant current source, but, in order to take into account small fluctuations in the current, the output current is usually measured, and the velocity is determined from the ratio of output voltage to input current from equation (3) rewritten as:

$$v = (1/km) \cdot (E/I) \quad \text{(equation 4)}$$

The constant (1/km) thus relates the flow velocity to the ratio of measured voltage to applied coil current, which we will hereafter refer to as R, giving $v = R \cdot E/I$.

The above equation represents a reasonably good approximation for most purposes, at constant current. However, the inventor has appreciated that, in fact, the field strength is not directly proportional to the input current. Thus, errors can arise, which can be significant if the flowmeter is highly accurate (the inventor has found the problem particularly acute in the development of meters of accuracy of the order of 0.1%), hitherto necessitating the use of high stability accurately calibrated constant current sources, which can add to manufacturing time and cost, and may present particular problems in battery powered equipment. In addition, pursuant to the invention, to optimise power consumption, it has been proposed to make measurements at one of a plurality of currents or at a current which may be continuously varied.

SUMMARY OF THE INVENTION

In general terms, the invention provides that, at least for circumstances in which the non-proportionality of field strength to input current could be significant, in place of the constant calibration factor, m in equation 2 or any derived constant such as R a variable factor, based on the measured value of current, is utilised. An alternative way of considering the invention is to consider the induced field to be equivalent to a function M(I), where M is not directly proportional to I. M is normally a non linear function, but may in one embodiment simply be equal to I minus an offset; in any event the output signal will be a non-linear function of (1/I).

According to a first aspect of the invention, there is provided an electromagnetic flowmeter signal processing apparatus for use with an electromagnetic flowmeter including a coil past which a fluid can flow, the coil being arranged so as to generate a magnetic field of strength dependent upon the magnitude of current supplied to the coil thereby to induce in said fluid a voltage indicative of a parameter of the fluid's flow, the apparatus comprising means for measuring the current supplied to the coil, means for measuring the voltage induced in the fluid and means for producing an output signal representative of the flow parameter and generally proportional to the ratio of the measured voltage and the measured current, characterised in that the producing means is arranged to calculate or adjust the output signal in dependence on the measured current value to compensate for non-linear dependence of the field, and thus the induced voltage, on applied current.

In another aspect, the invention comprises a method of obtaining a measure of a parameter representative of flow rate in an electromagnetic flowmeter, the method comprising dividing the voltage induced across the fluid by a function of the current flowing through a magnetic field-generating coil of the flowmeter, wherein the function is not directly proportional to the current. The function is preferably selected to be a better approximation to the actual field generated by the coil than a linear approximation, over at least a range of current values.

By flowmeter signal processing apparatus, in this specification, we mean apparatus capable of processing signals derived from a flowmeter; the signal processing apparatus will typically be integrated into a flowmeter assembly including the field generating coils, voltage sensing electrodes and means for supplying current to the coils and other components, but may be provided separately for connection to a flowmeter skeleton comprising only coils and sensing electrodes.

In one embodiment of the invention, the producing means is arranged to multiply the ratio of output voltage to input current by a calibration factor; the calibration factor being adjusted as a function of current amplitude. The calibration factor need not, however, be continuous, and may instead be constituted by a plurality of discrete values which are sequentially selected as the input current amplitude varies.

The calibration factor may be evaluated either from a look-up table or by calculation. In the event that calculation is used, one simple algorithm that can be used is to subtract a relatively small offset value from the measured current.

Substituting into equation 4, we have $$v = R \cdot E/(I - I_0) \quad \text{(equation 5)},$$

Electromagnetic flowmeters typically employ a ratiometric design; that is, the flow is generally determined from the ratio of the output EMF, E to the input current, the ratio being multiplied by a constant to give the flow rate. Re-eriting equation (5) in terms of the ratio E/I gives:

$$v=R(I/(I-I_0))\cdot E/I \qquad \text{(equation 6)}$$

This is equivalent to employing a calibration factor which varies as a function of $I/(I-I_0)$, or as a function of $1/(1-p)$, where p is equal to $I_0/I$. In each case, $I_0$ is empirically determined.

This correction is relatively simple to calculate, and gives significantly better results than an uncorrected value of current for reasonably large values of I. As I reduces to a comparable value to the offset current $I_0$, the value for v obtained becomes too large, and becomes undefined at $I=I_0$. The value of $I_0$ may be altered for different ranges of current.

Exponential correction

A better correction is found by considering B to be a function, M(I), as follows:

$$B=I\cdot K\cdot (1-e^{-I/K_2}) \qquad \text{Equation 7}$$

Substituting into equation 1 gives $$v=R\cdot E/(K_1(1-e^{-I/K_2})) \qquad \text{Equation 8}$$

or $$v=R\cdot [I/(K_1(1-e^{-I/K_2}))]\cdot E/I \qquad \text{Equation 9}$$

in which the term $[I/(K_1(1-e^{-I/K_2}))]$ gives a correction factor to be applied to the velocity derived in the conventional manner.

Polynomial Correction

As an alternative to the exponential correction factor mentioned above, empirical compensation using a (preferably at least third order) polynomial may be employed; this is found to be still better in many cases.

The flow velocity can be computed from $$V=k*emf/(a*I^3+b*I^2+c*I+d)*(R_{ref})$$

where a, b, c & d are coefficients dependent on sensor construction.

Now for correct behaviour of the system it is essential that d=0, e.g. intercept of zero, otherwise with zero coil current the equation produces an output, which is clearly not the case for a real system. From the above the value of k can defined such that c=1. Thus by using 2 coefficient a & b, it is possible to define a value of k which is constant independent of coil current.

The velocity then becomes:

$$V=k*emf/(A*I^3+B*I^2+I)*(R_{ref}) \text{ (where } A=a/c \text{ and } B=b/c\text{)}$$

In order to render the value of k equivalent to that of an uncompensated head at 0.5 A, we can apply a normalising factor:

$$V=k*emf/((A*I^3+B*I^2+I)*R_{ref}*(0.5/(A*0.5^3+B*0.5^2+0.5))$$

When I=0.5 the entire equation simplifies to $$V=k*emf/(R_{ref}*0.5)$$

Where k is the k factor whose value we are familiar with.

Power-law correction

As a further alternative, a power-law correction factor may be employed.

The flow velocity can be computed from $$V=k*emf/(g*I^p*R_{ref})$$

where g=gain term p=power term

To limit the number of terms it is possible adjust k to set g=1, thus this technique only requires one extra B-H compensation term p, as compared to the 2 terms a & b for polynomial compensation.

Calculation of correction factors

If the apparatus includes a moderately powerful microprocessor to control its operation, it is straightforward to calculate the correction factor numerically for each measurement. However, to reduce processing power required (this may be done to reduce power consumption), it may be convenient to store values in a computer-based or other electronic look-up table, and to interpolate, for example linearly, between stored values as necessary.

As a further alternative, the apparatus may store a plurality of empirically determined correction factors and simply look up a correction factor appropriate to the current measured. This may be enhanced by linear interpolation between stored values. Indeed, the apparatus may switch between a variety of techniques, for example at large values of current, the offset current calculation may be employed. At intermediate values of current, the exponential correction may be employed, and at low values of current, a look up table may be employed. It is thus to be appreciated that the precise method employed for correcting the measured value is not critical, but may be freely selected to attain the accuracy desired with the processing power available.

Preferably, the apparatus includes means for adjusting the current supplied to the coil, either substantially continuously or by switching the current between a plurality of discrete values or ranges, preferably in dependence on a measure of the flow rate, whereby a lower current may be applied to the coil at a higher flow rate. This may enable power consumption to be optimised, by enabling a lower coil current to be employed at higher flow rates, where the signal-to noise ratio is inherently larger.

This feature may be provided independently in a further apparatus aspect comprising an electromagnetic flowmeter coil current supply comprising adjustable current supply means for supplying a current to a coil of an electromagnetic flowmeter, means for detecting a measure of flowrate through the flowmeter, and means for controlling the adjustable current supply means to supply a first, higher current to the coil at a first, lower, value of flow rate and a second, lower, current to the coil at a second, higher, value of flow rate.

The current may be adjusted in only two steps, for example between first and second values of current differing substantially, for preferably by a factor of at least 2, in dependence on comparison of a measure of flow velocity to a threshold. This may enable a saving of power, without undue complexity, as a higher current may be employed when necessary only when the flow rate falls below a certain value. It will be appreciated that at the switching point the signal to noise ratio will change significantly, but, provided power consumption can be tolerated and the minimum signal to noise ratio is above a threshold, this may cause no problem. The apparatus may include means for maintaining the current constant at a selected value.

For better power management, a plurality of current values may be employed, or there may even be substantially continuous variation.

It is to be noted that, whilst the above aspects are independent, there is considerable advantage in employing both aspects together; power consumption can be optimised by employing reduced coil current when the flow rate is sufficient to alleviate signal to noise ratio problems, without sacrificing measurement accuracy due to non-linear field dependence on coil current.

The invention also provides a method of calibrating an electromagnetic flowmeter, comprising the steps of measuring the field generated by a coil of the flowmeter as driver currents of differing amplitudes are supplied to the coil, and utilising the measurements to generate data for use in generation of output signals derived from the flowmeter and indicative of a parameter of fluid flow relative to the coil, the data the data including information enabling compensation of the output signals for non-linearity in the relationship between the supplied current and the generated field for said coil.

The invention may thus provide advantage in allowing for interchangeability of sensing elements and toleration of greater differences in current settings than would be the case if calculation based on a linear relationship between applied current and generated field were used. By giving greater freedom to vary coil current without sacrificing accuracy, the invention may also permit power consumption to be optimised.

In order that the invention may be clearly understood and readily carried into effect, one embodiment thereof will now be described by way of example only, with reference to the accompanying drawings in which:

DETAILED DESCRIPTION OF PREFERRED EMBODIMENT

Figure 1:
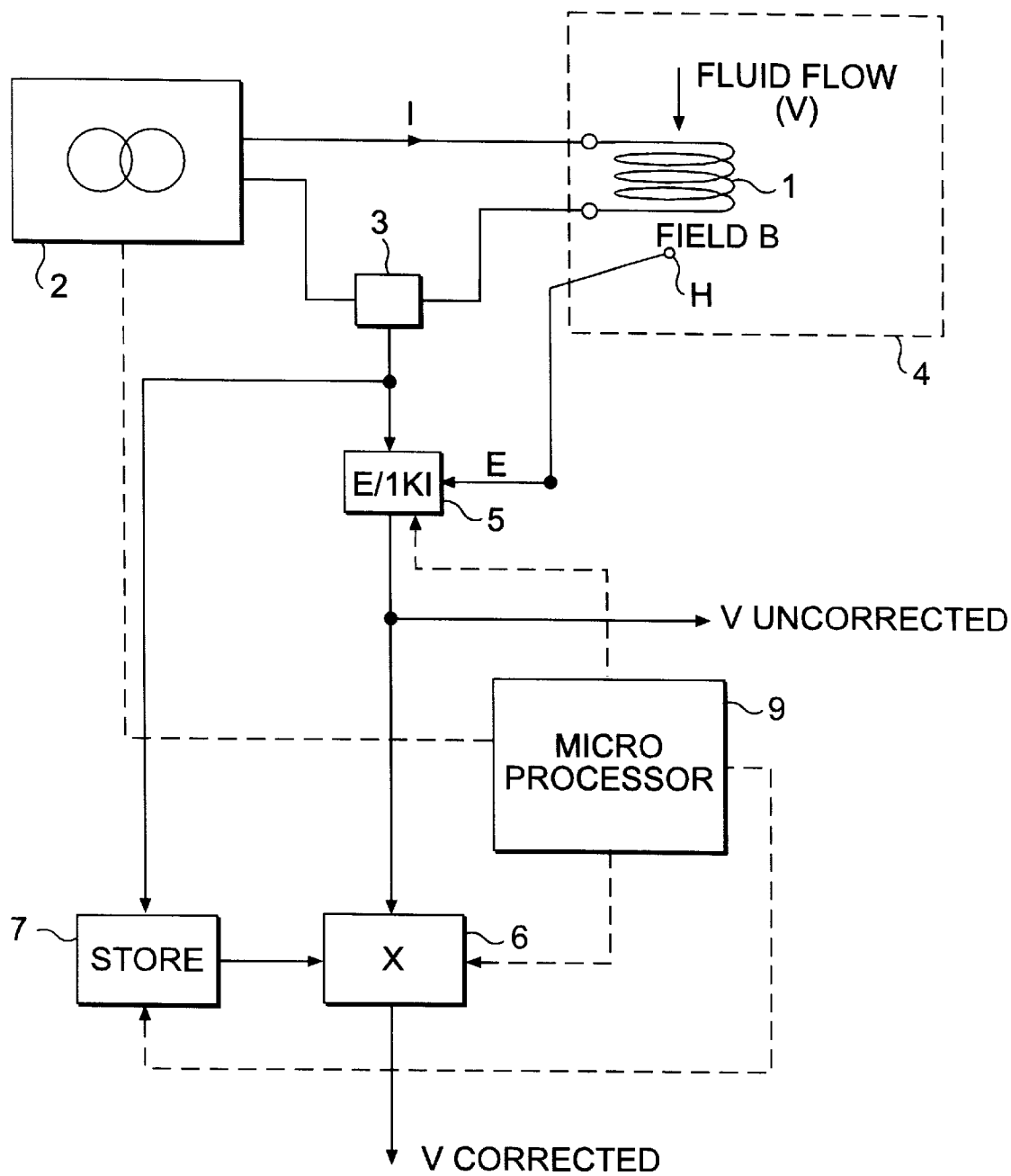
FIG. 1 shows, in schematic form, apparatus in accordance with one example of the invention.

Referring now to FIG. 1, an electromagnetic flowmeter is shown schematically at 1. A current supply for the coil 1 is shown at 2, and a device, which may take any convenient form, capable of measuring the current I supplied to the coil 1 is indicated at 3. The current source 2 is a switchable constant current source, arranged to produce a substantially constant current, the magnitude of which can be selected by the controller 9, discussed below. In this embodiment, the current is switchable from a current of about 150 mA (used at high flow rates) to a current of about 500 mA when the flow rate falls below a threshold, to improve signal to noise ratio at low flow rates. In an alternative embodiment, the current is switchable in 3 steps, from about 100 mA, to about 250 mA to about 500 mA, allowing improved signal to noise ratio or power consumption at intermediate flow rates.

Switching of the field coil current may also enable the flow rate measurement range to be extended, as the output voltage range required is reduced. Of course, more steps may be employed, or a continuous variation in current may be employed; in a development, which may be provided independently, the current may be adjusted to maintain the output voltage substantially constant, or at least within a defined range at which high measurement accuracy can be obtained. It will be appreciated that adjusting the coil current requires iteration; first a measure of the flow has to be obtained, and then the current adjusted. Thus, for rapidly changing flow rates, there may be complications caused by frequent changes in the coil current. Surprisingly, it is found that, although optimum power efficiency and signal to noise-ratio might be expected to be improved if a large number of current settings were provided, or if a continuously adjustable current were employed, it is found that, in practice, due to changes in flow rate, it may be better to limit the number of different discrete current settings to 2 or more (in some cases preferablyly only 2 or 3 and preferably less than about 5 or 10).

It is also desirable to incorporate a degree of hysteresis in the control means which determines the point of switching between current values, to prevent frequent switching when the flow rate fluctuates about a switching threshold.

The flowmeter may be mounted, for example, in a pipeline to monitor the flow of fluid therein, and in this example there is provided a sensor 4 to measure the voltage E induced in the fluid by the field B generated by the current I flowing through the coil 1, with the objective of measuring the rate v of fluid flow along the pipeline as described above.

In conventional usage of the flowmeter, it is assumed that there is a linear relationship between the strength B of the magnetic field generated by the coil 1 and the applied current I. In these circumstances, electrical signals indicative of I and E are derived from the measuring device 3 and the sensor 4 respectively and applied to a circuit 5 which divides E by I to form their ratio and is programmed to factor in the constant km to satisfy equation 4. Circuit 5 thus provides an output signal indicative of v, and in many instances this signal is of sufficient accuracy for the purposes of the intended measurement.

Where high accuracy is called for, however, and/or there is considerable fluctuation of the current I applied to the coil 1 between measurements, provision is made, according to the invention, to allow for the non-linear relationship between the applied current I and the magnetic field generated by the coil 1. To this end, the output signals from the circuit 5 are applied to a further circuit 6 wherein they are multiplied by correction factors provided by a unit 7. The circuit 7 is supplied with a signal, indicative of the amplitude of the current I, from the measuring device 3, and may either calculate correction factors on the fly, according to a formula, as measurements proceed, or select predetermined factors from a store, such as a look-up table, in dependence on the amplitude of the current I. If predetermined, discrete factors are retrieved from a store, linear interpolation may (if desired) be used to create factors for current amplitudes falling between those for which accurate stored values are available.

Figure 2:
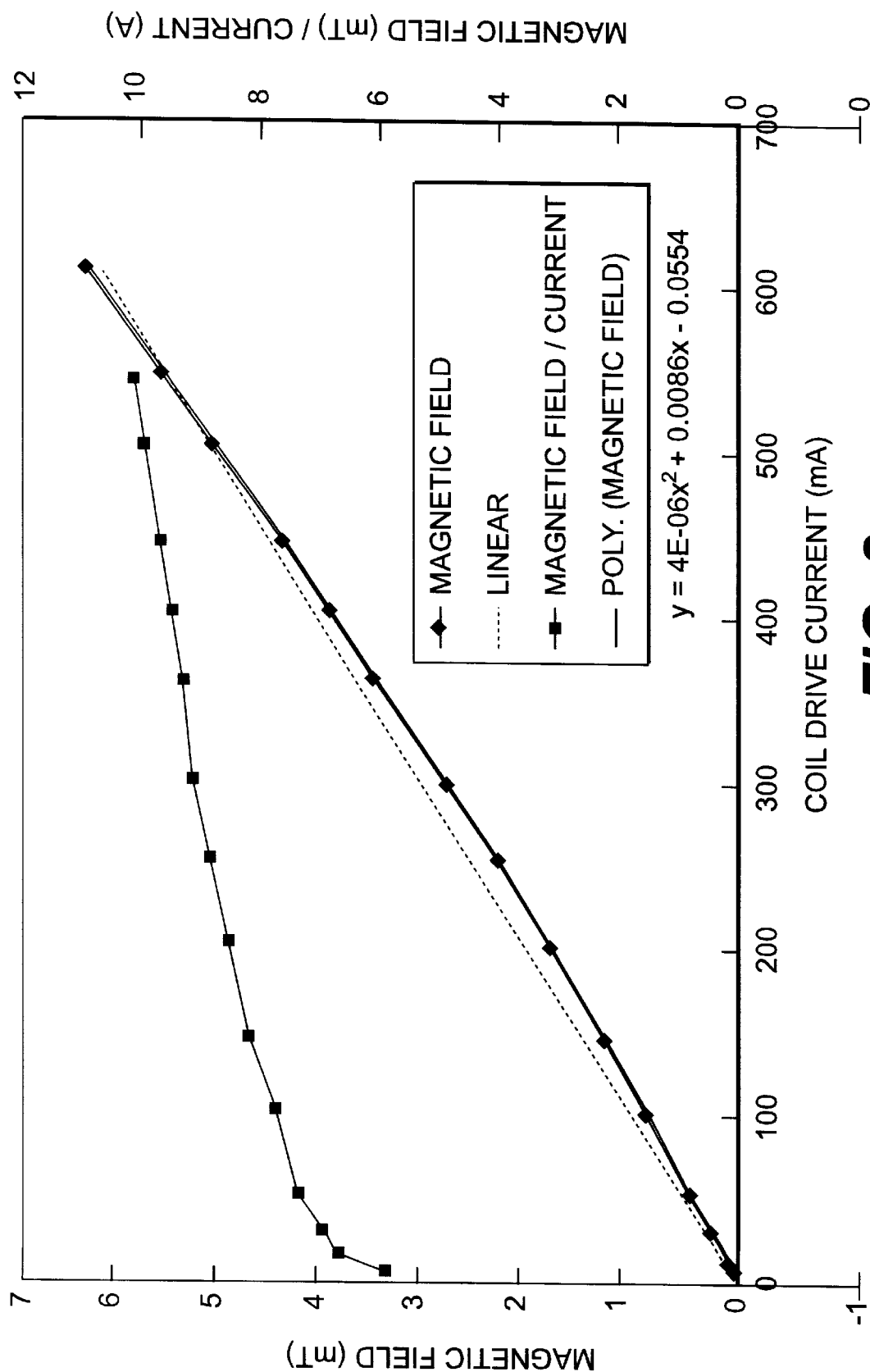
FIG. 2 shows the variation of B field with current for a coil used in a typical practical electromagnetic flowmeter, together with the ideal field predicted by equation (2) above, and the variation of the ratio of field to current.
Figure 3:
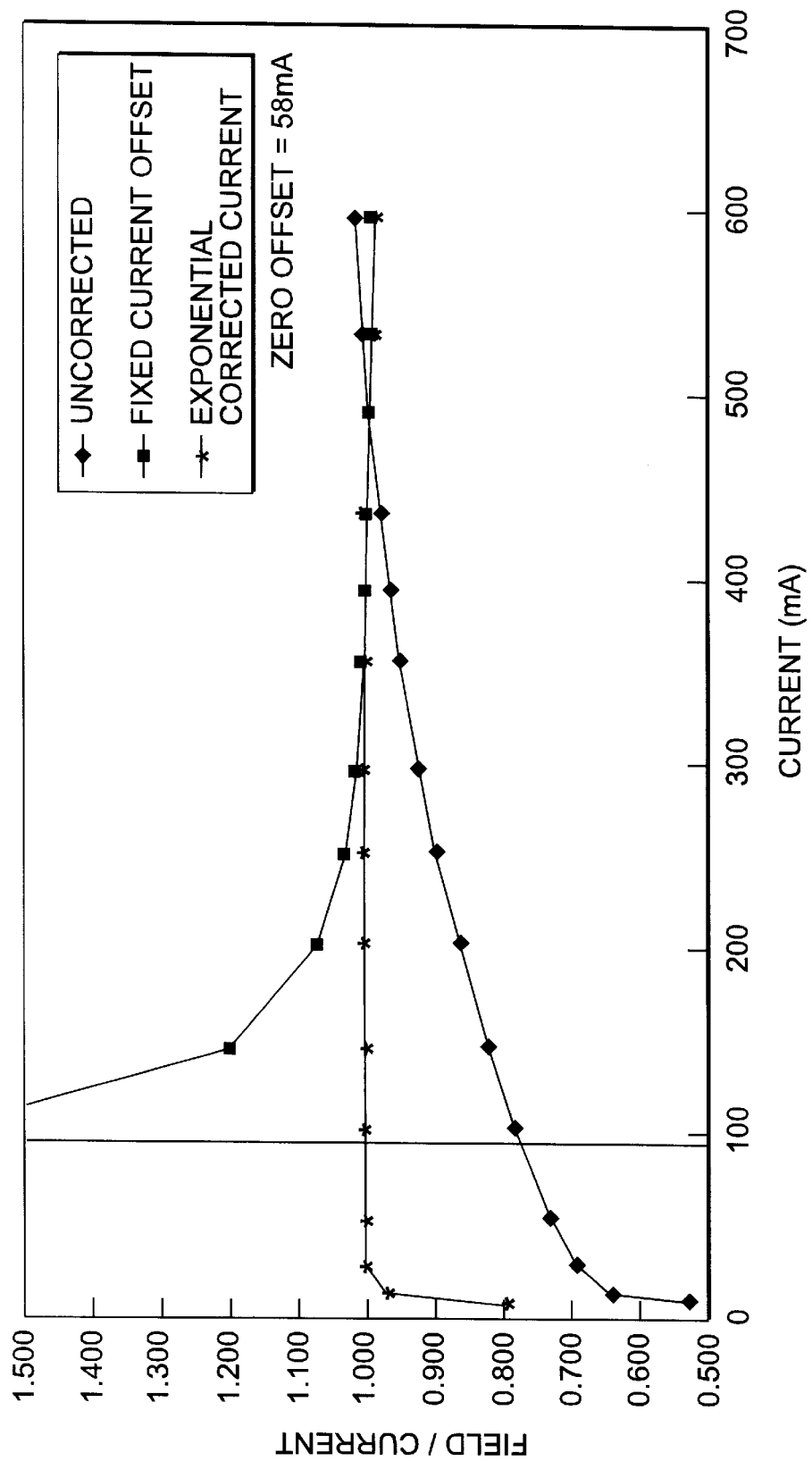
FIG. 3 shows the variation of ratio of the predicted field strength to the actual field strength with coil current, assuming equation (2) applies, and applying two different correction formulae.
Figure 4:
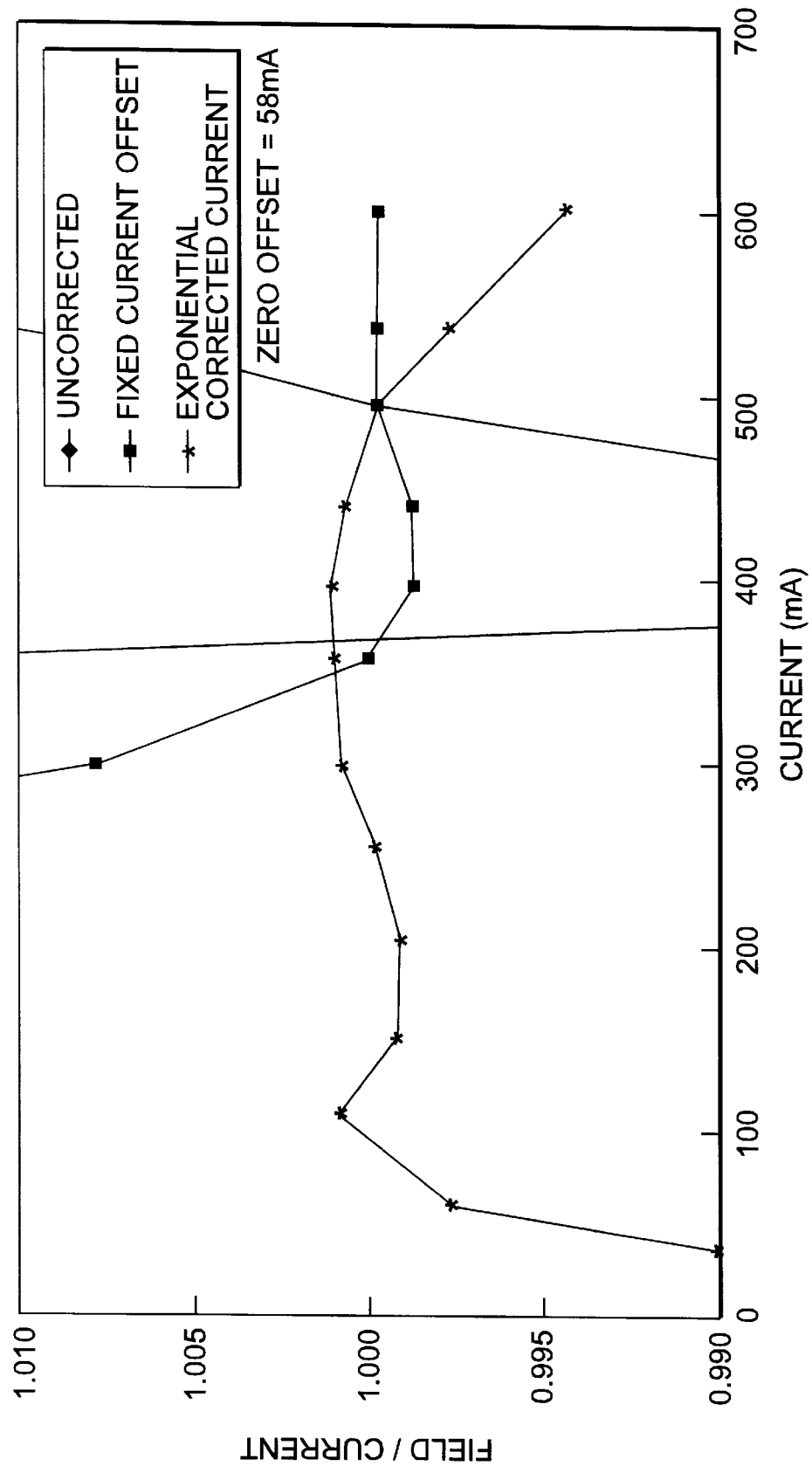
FIG. 4 shows detail of Pig. 3 on an enlarged scale.

Referring to FIGS. 2 to 4, the effects of non-linear dependence of field strength on coil current will be described.

Referring first to FIG. 2, the non-ideal behaviour of a real coil can be seen. Referring to the left hand scale, the straight dotted line shows the predicted variation of B with current based on a constant calibration factor for the coil concerned. The curved line with rhombic points shows the measured value of B for the coil, and the closely aligned curve shows an empirical approximation to the B-field, using a quadratic function $B=aI^2+bI+c$, where, in the example given, values of a=4E-6, b=0.0086 and c=−0.0554 were found to give a good fit. Thus, another method of correcting the output signal is to consider the B field to be a quadratic function of I and determine coefficients which fit the measured field values best, then use this equation in place of equation 2. Thus, a measure of flow velocity may be obtained by dividing a measure of the induced voltage by a quadratic function of I.

FIG. 2 also shows, plotted as the square points, and referring to the right-hand axis, the ratio of measured B field to applied current. If the behaviour were ideal, this would be a horizontal line at height m. As can be seen, in practice, the ratio diminishes as the current drops.

FIG. 3 illustrates how the field varies with current when a correction factor is applied to the current; this is equivalent to showing how the ratio of measured to estimated field varies, where the field is calculated based on the corrected current. The line with rhomboid points illustrates the uncorrected variation, the line with square points illustrates the variation when a fixed current offset is applied, and the line with crossed data points illustrates the variation when a correction of the form given in equation 7 is employed.

As can be seen, a simple correction, using a fixed offset, gives significantly better results for reasonably large values of current (here from about 300–600 mA) as compared to the uncorrected value which exhibits an error of over 10% at 300 mA. Thus, even this simple correction, which is straightforward to implement in either analogue or digital signal processing hardware, can provide a significant improvement over prior art systems. However, at smaller values of current, deviation is observed, as the coil current becomes closer to the offset current.

The correction given by equation 7 gives results which, on the scale of FIG. 3 appear near perfect over a range of current from under 50 mA to 600 mA. FIG. 4 shows the same results on an enlarged scale, from which it can be seen that the error over the above range is at most about 0.5%, and is of the order of 0.1% over a range from about 100 mA to 500 mA. The same figure also shows that using a fixed current offset gives an error within 1% over a current range of about 300 to 600 mA, whereas the uncorrected value only gives an accuracy within 1% at a current of 500 mA (the calibration point), and goes of the scale as soon as the current deviates by about 10 mA or so.

The correction factors may be calculated by a digital microprocessor, but, in other embodiments, analogue signal processing circuitry may be employed. Indeed, a crude correction may be achieved simply by means of a circuit which tends to reduce the output signal as the current increases and vice versa. Most preferably, the explicit calculation of E/I performed by unit 5 illustrated in FIG. 1 is integrated with correction of the output in dependence on the current in a combined calculation, so the generation of an uncorrected value for v will only be notional.

Control is preferably electronic, and electronic means such as a microprocessor 9 is preferably provided to control the sampling, timing and other functions of the various components shown in the drawing. The inclusion of the microprocessor 9 is indicated schematically in the drawing, and the dashed line interconnections between the microprocessor 9 and other components of the apparatus indicate, as appropriate, control of sampling (measurement) and timing functions.

The factors applied to the output signals from circuit 5 may, as described above, be directly measured or calculated. In any case, even when only a crude correction is applied as the current deviates from a single design figure, the making of proper allowance for the lack of linearity between I and B produces results that are at least as accurate as those produced by conventional systems in which no such allowance is made.

Figure 5:
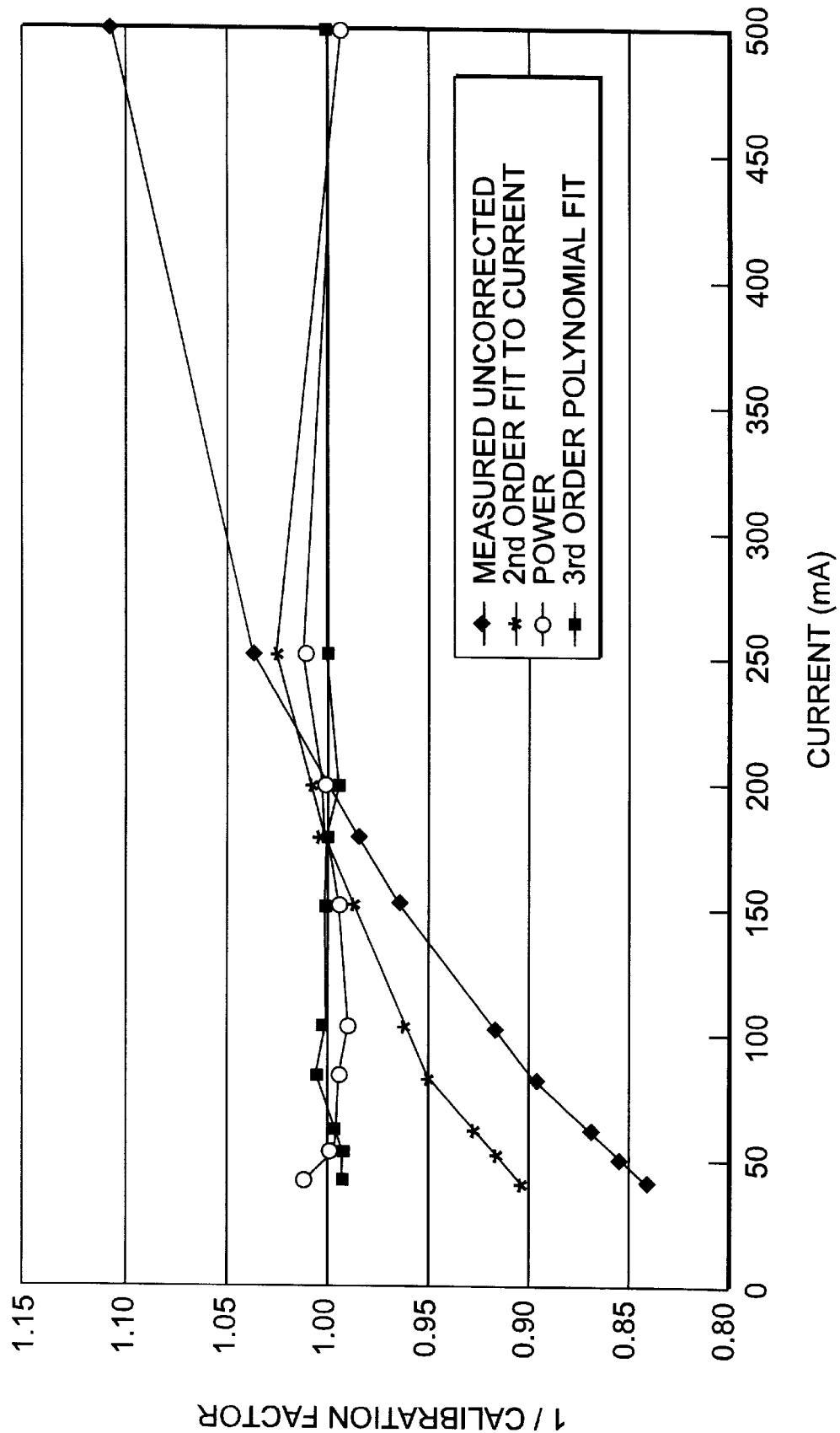
FIG. 5 shows the variation of 1/calibration factor with current, uncorrected and applying 2nd and 3rd order polynomial corrections and a power law correction.

Referring to FIG. 5, the effects of polynomial and power law correction are illustrated for a typical flowmeter. As can be seen, a second order polynomial gives a marked improvement as compared to the uncorrected results. A second order polynomial has the benefit of being very straightforward to implement computationally.

A marked improvement may be attained if a third order polynomial fit is applied, and this too is relatively straigtforward to implement.

Also shown in FIG. 5 is the effect of a power-law fit. This has the benefit of having fewer coefficients to determine empirically than a 3rd order polynomial, but provides similar results.

Figure 6:
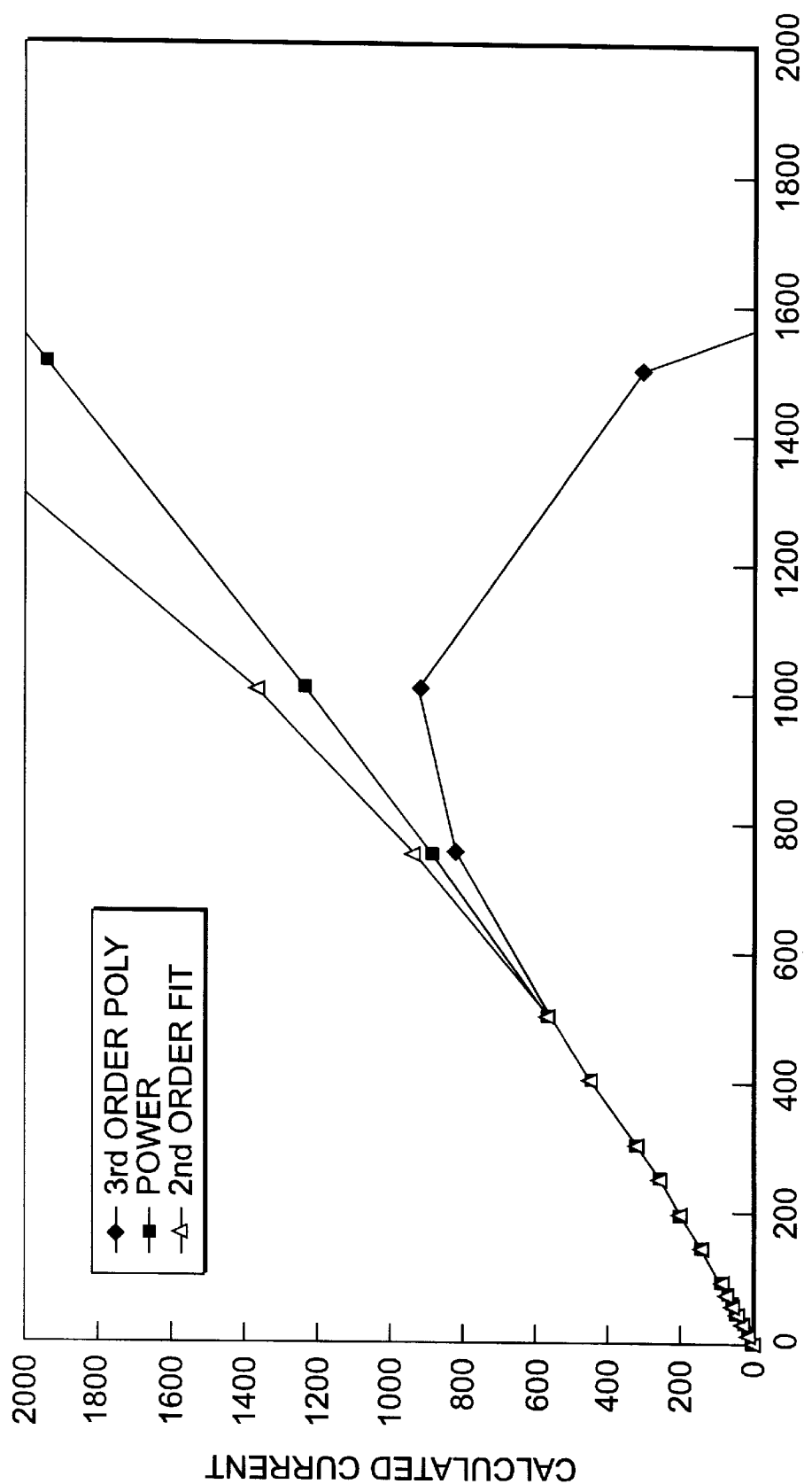
FIG. 6 illustrates divergence of a 3rd order polynomial at high currents.

Referring to FIG. 6, divergence of calculated currents (based on correcting the current using a correction factor) from actual currents at higher currents is illustrated. As can be seen, a third order polynomial correction may diverge significantly at higher currents, and this must be taken into account, to ensure that a sensible correction is used throughout a desired current operating range.

The appended abstract is incorporated herein by reference. Each feature disclosed may be independently provided, unless otherwise stated.

What is claimed is:

1. An electromagnetic flowmeter signal processing apparatus for use with an electromagnetic flowmeter including a coil past which a fluid can flow, the coil being arranged so as to generate a magnetic field of strength dependent upon the magnitude of current supplied to the coil thereby to induce in said fluid a voltage indicative of a parameter of the fluid's flow, the signal processing apparatus comprising means for measuring the current supplied to the coil, means for measuring the voltage induced in the fluid and means for producing an output signal representative of the flow parameter and approximately proportional to the ratio of the measured voltage and the measured current, characterised in that the producing means is arranged to calculate or adjust the output signal in dependence on the measured current value to compensate for non-linear dependence of the field, and thus the induced voltage, on applied current.

2. Electromagnetic flowmeter signal processing apparatus for use with an electromagnetic flowmeter including a coil past which a fluid can flow, the coil being arranged so as to generate a magnetic field of strength dependent upon the magnitude of current supplied to the coil thereby to induce in said fluid a voltage indicative of a parameter of the fluid's flow, the signal processing apparatus comprising means for measuring the current supplied to the coil, means for measuring the voltage induced in the fluid and means for producing an output signal representative of the flow parameter and approximately proportional to the ratio of the measured voltage and the measured current, characterised in that the producing means is arranged to calculate or adjust the output signal in dependence on the measured current value to compensate for non-linear dependence of the field, and thus the induced voltage, on applied current wherein said means for adjusting comprises a circuit for receiving said output signal, a store of correction factors appropriate for different values of said current, means for supplying to said circuit correction factors selected from said store in dependence upon said current and means included in said circuit for utilising the selected factors to adjust said output signal.

3. Apparatus according to claim 2 wherein said means included in said circuit comprises a multiplication component effective to multiply said output signal by the selected correction factors.

4. Electromagnetic flowmeter signal processing apparatus for use with an electromagnetic flowmeter including a coil past which a fluid can flow, the coil being arranged so as to generate a magnetic field of strength dependent upon the magnitude of current supplied to the coil thereby to induce in said fluid a voltage indicative of a parameter of the fluid's flow, the signal processing apparatus comprising means for measuring the current supplied to the coil, means for measuring the voltage induced in the fluid and means for producing an output signal representative of the flow parameter and approximately proportional to the ratio of the measured voltage and the measured current, characterised in that the producing means is arranged to calculate or adjust the output signal in dependence on the measured current value to compensate for non-linear dependence of the field, and thus the induced voltage, on applied current wherein said means for adjusting comprises means for receiving said output signal and a signal indicative of said current, calculating means for operating upon an indication of said current in accordance with a predetermined procedure to generate a correction factor, and means for applying said correction factor to said output signal.

5. Electromagnetic flowmeter signal processing apparatus for use with an electromagnetic flowmeter including a coil past which a fluid can flow, the coil being arranged so as to generate a magnetic field of strength dependent upon the magnitude of current supplied to the coil thereby to induce in said fluid a voltage indicative of a parameter of the fluid's flow, the signal processing apparatus comprising means for measuring the current supplied to the coil, means for measuring the voltage induced in the fluid and means for producing an output signal representative of the flow parameter and approximately proportional to the ratio of the measured voltage and the measured current, characterised in that the producing means is arranged to calculate or adjust the output signal in dependence on the measured current value to compensate for non-linear dependence of the field, and thus the induced voltage, on applied current arranged to calculate said output signal by calculating an adjusted value of current, and dividing the measured voltage by the adjusted value of current.

6. Electromagnetic flowmeter signal processing apparatus for use with an electromagnetic flowmeter including a coil past which a fluid can flow, the coil being arranged so as to generate a magnetic field of strength dependent upon the magnitude of current supplied to the coil thereby to induce in said fluid a voltage indicative of a parameter of the fluid's flow, the signal processing apparatus comprising means for measuring the current supplied to the coil, means for measuring the voltage induced in the fluid and means for producing an output signal representative of the flow parameter and approximately proportional to the ratio of the measured voltage and the measured current, characterised in that the producing means is arranged to calculate or adjust the output signal in dependence on the measured current value to compensate for non-linear dependence of the field, and thus the induced voltage, on applied current, wherein the output signal varies in proportion to the ratio of the measured voltage to a function of the measured current, said function not being directly proportional to the current.

7. Apparatus according to claim 6, wherein said function includes a polynomial.

8. Apparatus according to claim 7, wherein said polynomial is of order 3 or higher.

9. Apparatus according to claim 7, wherein the polynomial has empirically determined coefficients.

10. Apparatus according to claim 6, wherein said function is a function of the current raised to the power of an empirically determined coefficient.

11. Apparatus according to claim 6 wherein said function is of the form $$K_1 \cdot (1 - e^{-I/K_2})$$

where I is the measured current and $K_1$ and $K_2$ are empirically determined constants.

12. Apparatus according to claim 6 wherein said function is of the form $I-I_0$, where I is the measured current and $I_0$ is an empirically determined offset current.

13. Apparatus according to claim 6, wherein said function is implemented using a look-up table of discrete values, the apparatus including storage means for storing said table.

14. Apparatus according to claim 13, including means for interpolating between said stored values.

15. Apparatus according to claim 1, further including means for adjusting the value of current supplied to the coil in dependence on a control signal.

16. Apparatus according to claim 15, wherein the control signal is derived from a measure of flow rate, whereby a higher current is supplied at a lower flow rate.

* * * * *